(12) United States Patent
Colston et al.

(10) Patent No.: US 11,162,684 B2
(45) Date of Patent: Nov. 2, 2021

(54) PELLET HOPPER LINER

(71) Applicant: Traeger Pellet Grills, LLC, Salt Lake City, UT (US)

(72) Inventors: Michael Colston, Salt Lake City, UT (US); Daniel Sluder, Salt Lake City, UT (US); Phuong Hoang, Salt Lake City, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 166 days.

(21) Appl. No.: 16/412,191

(22) Filed: May 14, 2019

(65) Prior Publication Data

US 2019/0277507 A1    Sep. 12, 2019

Related U.S. Application Data

(63) Continuation-in-part of application No. 29/636,987, filed on Feb. 13, 2018, now Pat. No. Des. 867,065.

(60) Provisional application No. 62/670,960, filed on May 14, 2018.

(51) Int. Cl.
*F24B 13/04* (2006.01)
*A47J 37/07* (2006.01)
*F24B 1/199* (2006.01)
*F24B 1/08* (2021.01)
*F23B 50/12* (2006.01)

(52) U.S. Cl.
CPC .......... *F24B 13/04* (2013.01); *A47J 37/0786* (2013.01); *F24B 1/08* (2013.01); *F24B 1/199* (2013.01); *F23B 50/12* (2013.01); *F23K 2203/20* (2013.01)

(58) Field of Classification Search
CPC ......... A47J 37/0786; F24B 1/199; F24B 1/08; F24B 13/04; F23B 2900/00001; F23B 50/12; F23K 3/00; F23K 2203/20; F23K 2203/202
See application file for complete search history.

(56) References Cited

U.S. PATENT DOCUMENTS

| D212,656 S | 11/1968 | Ihde |
| 4,823,684 A * | 4/1989 | Traeger ............... A47J 37/0704 126/10 |
| D301,107 S | 5/1989 | Rocco |
| D303,061 S | 8/1989 | Fountain, Sr. |

(Continued)

FOREIGN PATENT DOCUMENTS

| KR | 10-1515001 B1 | 5/2015 |
| KR | 10-1627991 B1 | 6/2016 |
| KR | 2017-0003713 U | 10/2017 |

OTHER PUBLICATIONS

International Search Report from International Application No. PCT/US2019/032211, dated Nov. 6, 2019, 6 pages.

(Continued)

*Primary Examiner* — Alfred Basichas
(74) *Attorney, Agent, or Firm* — TraskBritt

(57) ABSTRACT

A pellet hopper for use in a pellet grill includes a first bottom panel, a second bottom panel, and a third bottom panel. Each bottom panel has an inner edge that partially defines a pellet evacuation opening. The first, second, and third bottom panels form respective first, second, and third nonzero angles relative to a horizontal plane. In this way, each bottom panel tilts downward toward the pellet evacuation opening.

11 Claims, 15 Drawing Sheets

(56) References Cited

U.S. PATENT DOCUMENTS

| | | | |
|---|---|---|---|
| 5,285,738 A * | 2/1994 | Cullen | F23B 1/00 |
| | | | 110/110 |
| D377,136 S | 1/1997 | Knuth | |
| D381,868 S | 8/1997 | Schmitt et al. | |
| 5,694,295 A | 12/1997 | Mochizuki et al. | |
| D580,209 S | 11/2008 | Chiang | |
| D747,922 S | 1/2016 | Borovicka et al. | |
| D784,759 S | 4/2017 | Nadal | |
| D788,525 S | 6/2017 | Parrish et al. | |
| D812,973 S | 3/2018 | Nadal | |
| D825,988 S | 8/2018 | Wang et al. | |
| D832,045 S | 10/2018 | Nadal | |
| D867,065 S * | 11/2019 | Colston | D7/407 |
| 2013/0298894 A1* | 11/2013 | Kleinsasser | A47J 37/0704 |
| | | | 126/25 R |
| 2014/0150698 A1* | 6/2014 | Walker | F23K 3/00 |
| | | | 110/293 |
| 2014/0326232 A1 | 11/2014 | Traeger | |
| 2015/0320259 A1* | 11/2015 | Tucker | A47J 37/0786 |
| | | | 126/25 R |

OTHER PUBLICATIONS

International Written Opinion from International Application No. PCT/US2019/032211, dated Nov. 6, 2019, 12 pages.

* cited by examiner

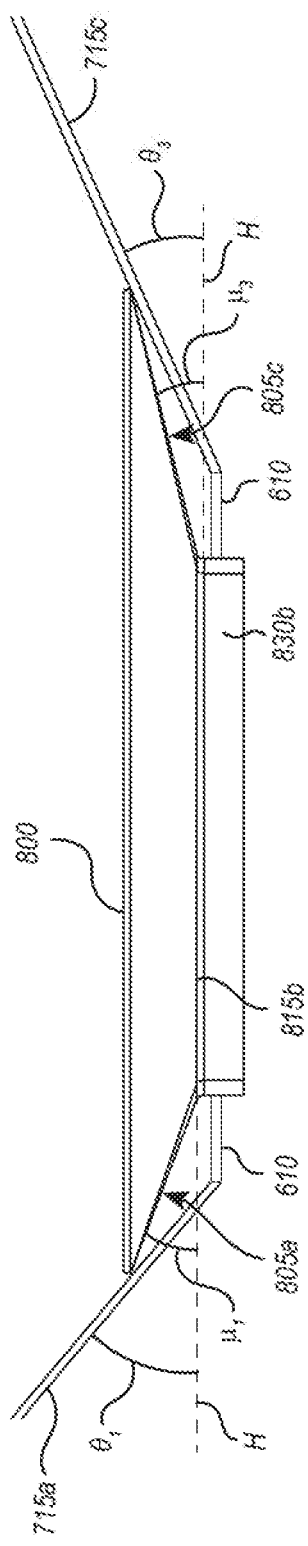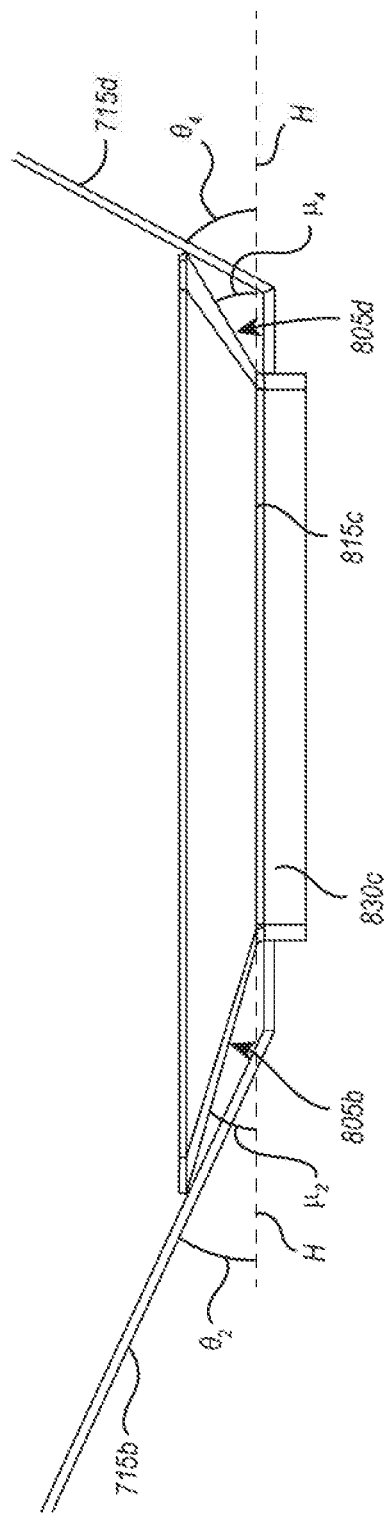

PELLET HOPPER LINER

CROSS-REFERENCE TO RELATED APPLICATIONS

This application claims the benefit of the filing date of U.S. Provisional Patent Application No. 62/670,960, filed May 14, 2018, and is a continuation-in-part of U.S. Design patent application Serial No. 29/636,987, filed on Feb. 13, 2018, now U.S. Pat. D867,065, issued Nov. 19, 2019, the disclosures of which are incorporated herein in their entireties by this reference.

TECHNICAL FIELD

The present invention relates generally to systems, methods, and devices for grilling and warming food products. In particular, the present disclosure relates to systems and devices for feeding fuel into a grilling device.

BACKGROUND

Consumers use a variety of grilling devices for cooking, grilling, and warming food products. Some grilling devices, including smokers and pellet grills, burn solid fuel. This solid fuel may be in the form of wood pellets or other pelletized solid fuel materials. Pellet grills and smokers burn solid fuel to generate heat and smoke, which enters a grilling chamber to cook food residing therein. Such grilling devices typically include an externally accessible cavity, which holds solid fuel pellets and feeds them into the grilling device to be burned. Those skilled in the art often refer to this externally accessible cavity as a hopper.

The hopper typically connects to an auger system, which slowly removes fuel pellets from the hopper and feeds them into a firepot. In conventional grilling devices, the auger system connects to the bottom of the hopper at one end and to the firepot at another end. In such a configuration, the auger system moves the pellets from the hopper to the firepot, which is situated within the grilling device. When the fuel pellets reach the firepot, a heating element ignites the fuel pellets, thus providing heat with which to cook and/or warm food products.

Along these lines, auger feeder systems can feed fuel pellets into the firepot at different rates, depending on the needs of the user. For example, increasing the rate at which fuel pellets are fed into the firepot results in higher cooking and smoking temperatures. Conversely, decreasing the rate at which fuel pellets are fed into the firepot decreases cooking and smoking temperatures.

Thus, to effectively cook with a pellet grill as described above, the auger system of the grilling device must be able to maintain the necessary flow rate of fuel pellets from the hopper into the firepot. However, in typical pellet grills and auger systems, a number of obstacles can cause fuel pellets to clog or get stuck, resulting in fuel pellets backing up in the system and hindering fuel flow.

When fuel pellets get stuck within hopper or auger systems of typical pellet grills, users are often required to unclog the fuel pellets themselves. Such unclogging may require the user to remove the fuel pellets, open the auger system, identify where the fuel pellets are stuck, and manually unclog the system. Manually unclogging pellet grills in this way takes time and causes frustration and inconvenience for the user.

Ultimately, the pellet grill cannot produce the necessary levels of heat and smoke when the hopper and auger system fail to feed fuel pellets into the firepot at an appropriate rate. Accordingly, there are a number of disadvantages in grilling devices and systems that can be addressed.

BRIEF SUMMARY

Embodiments of the present disclosure include systems, methods, and devices for grilling and warming food products. In particular, the present disclosure relates to systems and devices for feeding fuel into a grilling device. For example, in one embodiment of the present disclosure, a pellet hopper includes first, second, and third bottom panels. Each of the bottom panels include an inner edge that at least partially defines a pellet evacuation opening. Also, the first, second, and third panels form first, second, and third angles, respectively. The first, second, and third angles are nonzero angles with respect to a horizontal plane so that each panel tilts downward toward the pellet evacuation opening.

In another embodiment of the present disclosure, a pellet hopper assembly includes a hopper bottom and a wall panel. The hopper bottom includes a first panel connected to a second panel at a first interface and a third panel connected to the second panel at a second interface. Each panel includes an inner edge that at least partially defines a pellet evacuation opening. Also, the first, second, and third panels form first, second, and third nonzero angles with respect to a horizontal plane. As such, each panel tilts downward toward the pellet evacuation opening.

In such an embodiment, the wall panel is connected to the second and third panels at third and fourth interfaces, respectively. The wall panel includes a main surface and a bottom angled surface, which includes a fourth inner edge that also partially defines the pellet evacuation opening. The bottom angled surface of the wall panel also forms a nonzero angle so that the bottom angled surface tilts downward toward the pellet evacuation opening.

In another embodiment according to the present disclosure, a pellet evacuation insert is configured for placement within a pellet evacuation opening of a pellet hopper. In such an embodiment, the pellet evacuation insert includes first, second, third, and fourth trapezoidal surfaces connected. The inner edge of each trapezoidal surface at least partially defines a rectangular pellet evacuation insert opening. The pellet evacuation insert also includes first, second, third, and fourth surfaces extending downward from the inner edges, respectively. Each trapezoidal surface is disposed at a nonzero angle relative to a horizontal plane. In this way, each trapezoidal surface tilts downward toward the pellet evacuation insert opening.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the accompanying drawings. Understanding that these drawings depict only typical embodiments of the invention and are not, therefore, to be considered to be limiting of its scope, the invention will be described and explained with additional specificity and detail through the use of the accompanying drawings in which:

FIG. 8B illustrates a front view of a pellet evacuation insert according to an embodiment of the present disclosure; and FIG. 8C illustrates a left view of a pellet evacuation insert according to an embodiment of the present disclosure.

DETAILED DESCRIPTION

The present invention relates generally to systems, methods, and devices for grilling and warming food products. In particular, the present disclosure relates to systems and devices for feeding fuel into a grilling device. For example, in one embodiment of the present disclosure, a pellet hopper includes first, second, and third bottom panels. Each of the bottom panels include an inner edge that at least partially defines a pellet evacuation opening. Also, the first, second, and third panels form first, second, and third angles, respectively. The first, second, and third angles are nonzero angles with respect to a horizontal plane so that each panel tilts downward toward the pellet evacuation opening.

The pellet hopper of the present disclosure includes smooth pellet drop features that increase the evacuation efficiency of the pellet hopper, thus reducing the incidence of pellet evacuation failure. The embodiments disclosed herein, where implemented, may reduce the frequency of temperature loss during the processes of grilling and warming food products. Users are therefore able to use pellet grills without scrupulously overseeing the evacuation status of the fuel pellets into the auger system. Users can also avoid the need to restart the pellet grill in response to an interrupted pellet evacuation. Additionally, in some instances, the aforementioned benefits are available to existing pellet grills via after-market modification, as described below.

Figure 1A:
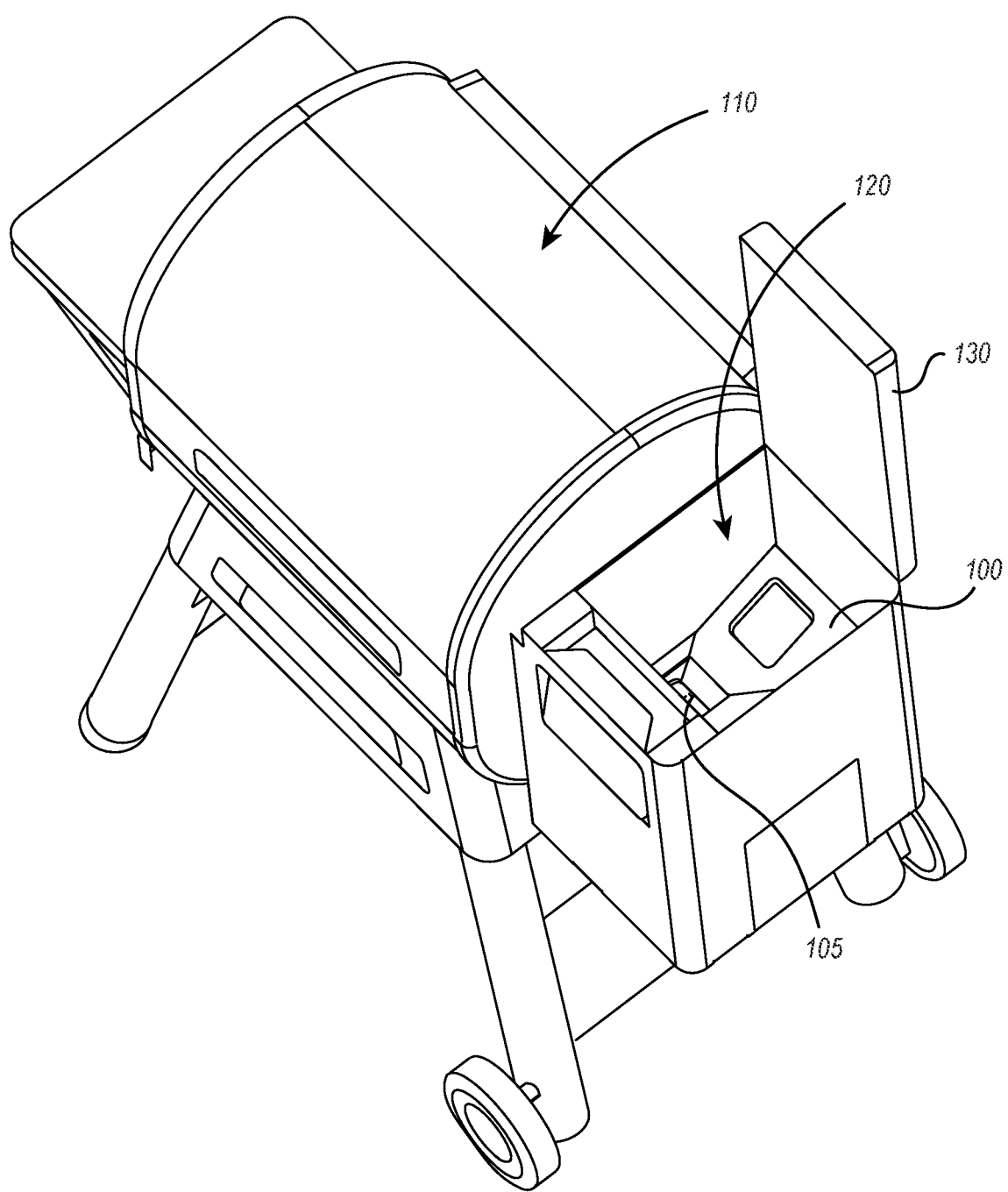
FIG. 1A illustrates a perspective view of a pellet hopper disposed within a pellet grill according to an embodiment of the present disclosure.

Turning now to the figures, FIG. 1 illustrates a perspective view of a pellet hopper 100 disposed within a pellet grill 110 according to an embodiment of the present disclosure. The pellet hopper 100 is disposed within a cavity 120 positioned to the side of the pellet grill 110. The pellet grill 110 also includes a hopper lid 130 that a user may open to selectively access the pellet hopper 100 inside the cavity 120.

Figure 1B:
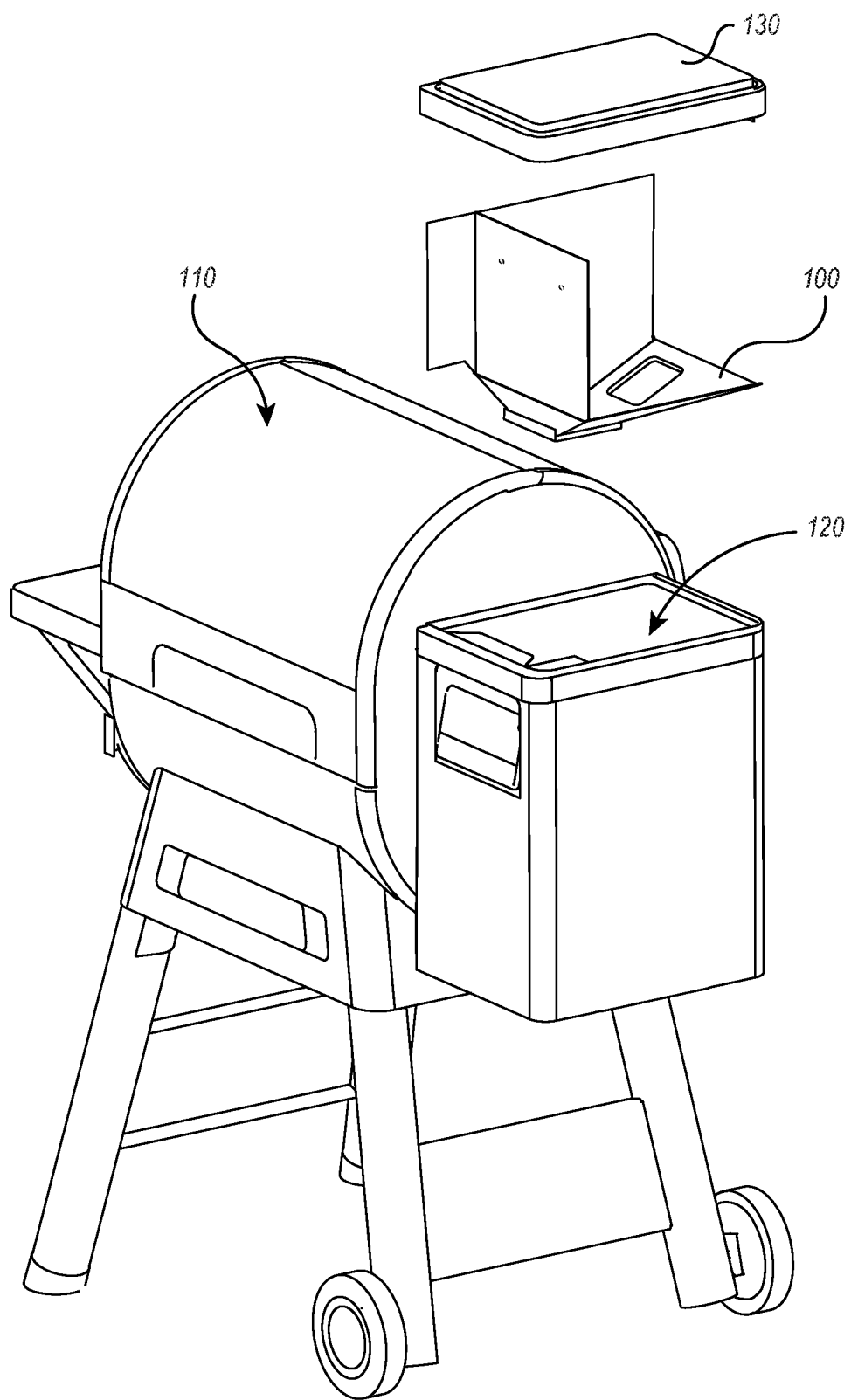
FIG. 1B illustrates an exploded view of the pellet hopper and pellet grill of FIG. 1A according to an embodiment of the present disclosure.
Figure 1C:
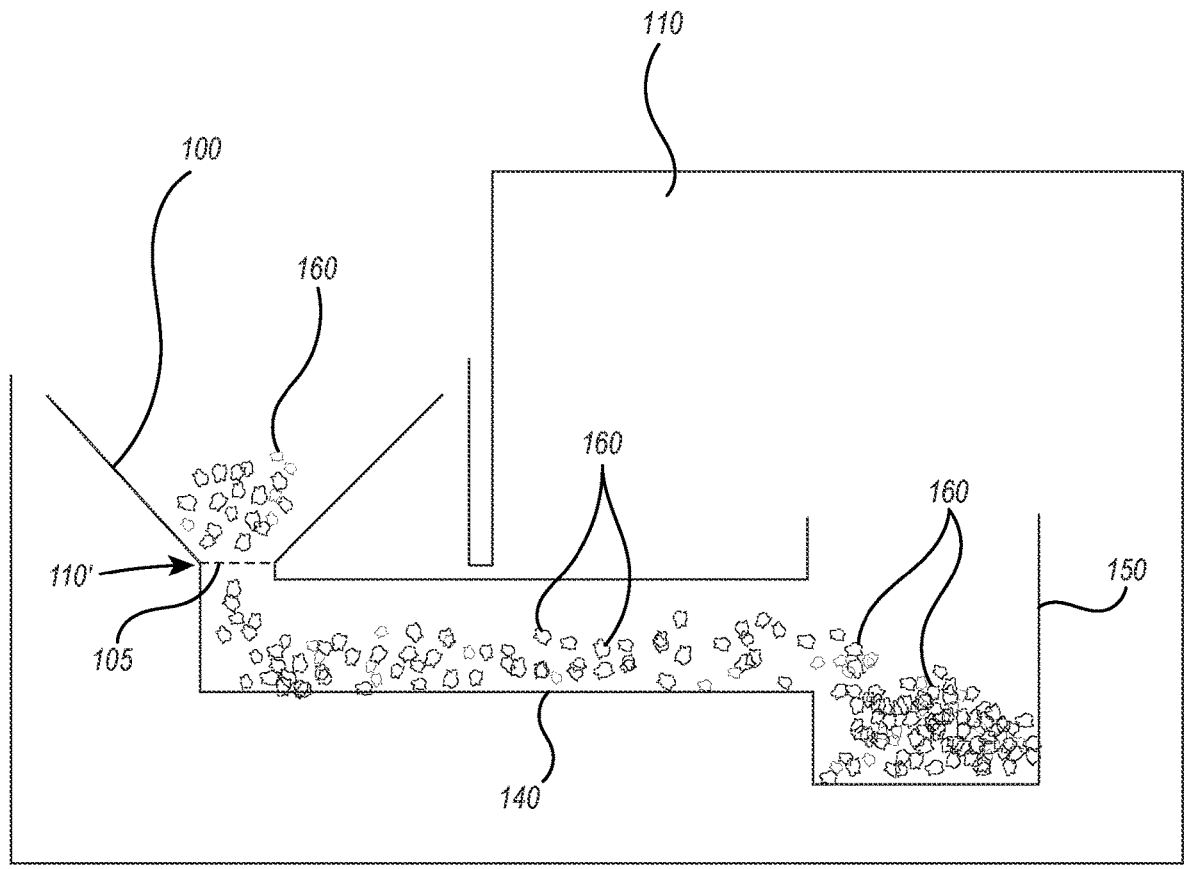
FIG. 1C illustrates a schematic view of an auger feeder system feeding fuel pellets into a firepot from a pellet hopper according to an embodiment of the present disclosure.

FIG. 1B illustrates the pellet grill 110, including the pellet hopper 100, cavity 120, and hopper lid 130 of FIG. 1 in an exploded view. During use, a user opens the hopper lid 130 and inserts fuel, such as solid fuel pellets, into the cavity 120 of the pellet grill 110. The pellet hopper 100 directs the flow of pellets down through a pellet evacuation opening 105 and into an auger feeder system 140 (see FIG. 1C). The auger feeder system then feeds the fuel pellets into a firepot for ignition and heat production.

Along these lines, FIG. 1C illustrates a schematic view of a pellet hopper 100, auger feeder system 140, and firepot 150 within a pellet grill 110. As shown, the pellet hopper 100 is disposed above the auger feeder system 140, which receives fuel pellets 160 through the pellet evacuation opening 105 of the pellet hopper 100. The auger feeder system 140 then feeds the fuel pellets 160 into the firepot 150 for combustion and heat production within the pellet grill 110.

The fuel pellets 160 pass from the pellet evacuation opening 105 of the pellet hopper 100 and into the auger feeder system 140 at the interface 110' therebetween. In one or more embodiments of the present disclosure, the interface 110' between the pellet hopper 100 and the auger feeder system 140 may also include one or more interface components such as gaskets, seals, connection means, or the like. Such interface components will be described in more detail below with reference to FIGS. 4A-4E. In embodiments described in the present disclosure, the interface 110' is substantially free of any obstacles that may interrupt the transfer of fuel pellets 160 from the pellet hopper 100 to the auger feeder system 140.

Figure 2A:
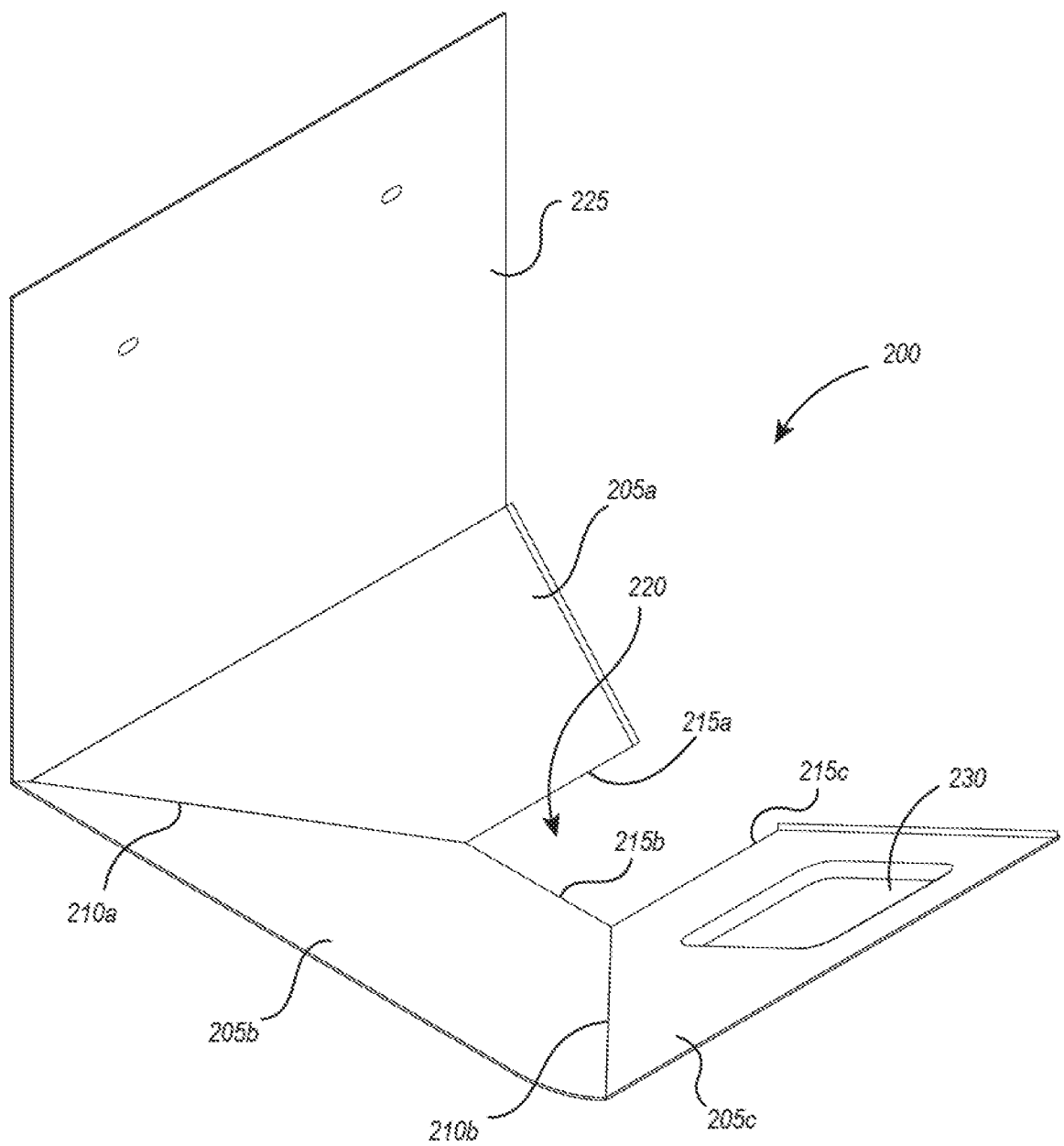
FIG. 2A illustrates a perspective view of a hopper bottom according to an embodiment of the present disclosure.

For example, FIG. 2A illustrates a perspective view of a hopper bottom 200 according to an embodiment of the present disclosure. The hopper bottom 200 may be one component of a pellet hopper assembly. The hopper bottom 200 illustrated in FIG. 2A includes a first bottom panel 205a, a second bottom panel 205b, and a third bottom panel 205c. The first bottom panel 205a is connected to the second bottom panel 205b at a first interface 210a and the second bottom panel 205b is connected to the third bottom panel 205c at a second interface 210b.

In one or more embodiments, the hopper bottom 200 may also include a fourth bottom panel (not shown in FIG. 2A) that is connected to the third bottom panel 205c at a third interface and the first bottom panel 205a at a fourth interface. This fourth bottom panel may also be angled at a nonzero angle relative to the horizontal plane defined by the pellet evacuation opening 220. Like the other bottom panels 205a-205c, the fourth bottom panel of an alternative embodiment may also include an inner edge that partially defines the pellet evacuation opening 220.

Also, as will be described below with reference to subsequent figures, one or more embodiments of the hopper bottom 200, such as the hopper bottom 200 illustrated in FIG. 2A, may also include one or more vertical walls extending vertically downward from one or more of the inner edges 215a-215c of the bottom panels 205a-205c. These vertical walls may extend downward to, or through, the interface 110' between the pellet hopper 100 and auger feeder system 140 shown in FIG. 1C. Again, more detail regarding inner edges 815a-815d and outer edges 825a-825d is given below with reference to FIGS. 7-8C. It is simply noted here that the embodiment of the hopper bottom 200 illustrated in FIGS. 2A-2C may also include these additional vertical walls.

In addition, it is important to note that in one or more embodiments of the pellet hopper 100 described herein, one or more vertical surfaces 225 may extend from up from an outer edge of each bottom panel 205a-205c. FIG. 2A illustrates one such vertical surface 225 extending up from the first bottom panel 205a. In one or more embodiments, similar vertical surfaces may interface with the interior of cavity 120 of the grill 110 shown in FIG. 1A. The vertical surfaces 225 may be separately formed with one or more bottom panels 205a-205c or integrally formed therewith.

Also, of note, one or more bottom panels 205a-205c of the present disclosure may include a secondary evacuation opening 230 extending therethrough. FIG. 2A illustrates such a secondary evacuation opening 230 extending through the third bottom panel 205c. A user may manipulate a door that removably covers the secondary evacuation opening 230 to selectively evacuate fuel pellets 160 out through the secondary evacuation opening 230 when necessary. In one or more embodiments, one or more secondary evacuation openings 230 may also serve as an overflow evacuation opening.

Each bottom panel 205a-205c includes a respective inner edge 215a-215c that at least partially defines a pellet evacuation opening 220, which lies in a horizontal plane defined by the inner edges 215a-215c. In addition, each bottom panel 205a-205c is disposed so as to form a nonzero angle relative to the horizontal plane. In this way, each of the bottom panels 205a-205c is tilted downward toward the pellet evacuation opening 220.

The angle at which each bottom panel 205a-205c is tilted downward toward the pellet evacuation opening 220 affects the transfer of fuel pellets 160 from the cavity 120, through the pellet evacuation opening 220, and into the auger feeder system 140. For example, the smaller the angle of each bottom panel 205a-205c relative to the horizontal plane defined by the inner edges 215a-215c of each bottom panel 205a-205c, the less inclined the fuel pellets will be to travel down each bottom panel 205a-205c toward the pellet evacuation opening 220 due to gravity.

In contrast, and along the same lines, the greater the angle of each bottom panel 205a-205c relative to the horizontal plane (i.e., the steeper the bottom panels), the more inclined the fuel pellets will be to travel down the bottom panels 205a-205c toward the pellet evacuation opening 220. Thus, the manufacturer can select the angles at which each bottom panel 205a-205c tilted to ensure effective evacuation of fuel pellets 160 through the pellet evacuation opening 220. When determining these angles, the manufacturer may take into account a number of factors that also affect the transfer of fuel pellets 160 toward the pellet evacuation opening 220.

For instance, one factor the manufacturer may consider is the frictional properties of the materials used to form the bottom panels 205a-205c. The manufacturer may also consider the frictional properties of the fuel pellets 60 a user will likely use to heat the pellet grill 110. Also, the manufacturer may consider the environment in which the user grills food with the pellet grill 110.

For example, moisture can affect the frictional properties of the fuel pellets 160 and the bottom panels 205a-205c and make each stickier. Thus, the manufacturer may form the bottom panels 205a-205c at steeper angles when the user is likely to expose the fuel pellets 160 and/or bottom panels 205a-205c to water from outdoor sprinklers, rain, dew, humidity or the like.

Figure 2B:
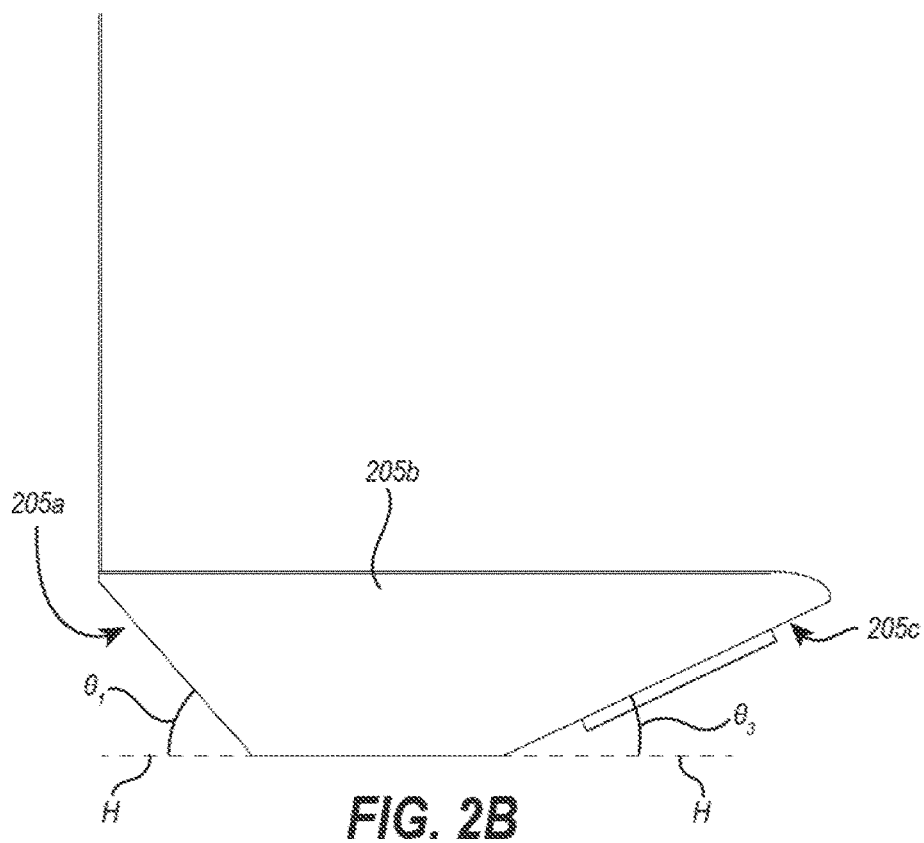
FIG. 2B illustrates a front view of a hopper bottom according to an embodiment of the present disclosure.
Figure 2C:
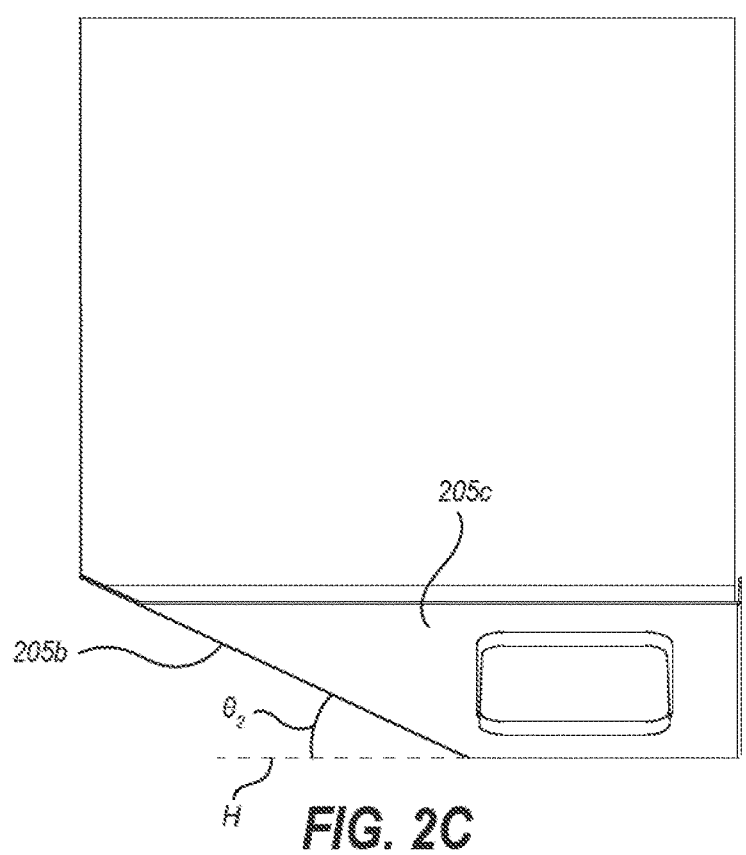
FIG. 2C illustrates a side view of a hopper bottom according to an embodiment of the present disclosure.

With this in mind, there are a number of angles, and ranges thereof, at which to dispose each bottom panel 205a-205c that may be advantageous to promote fuel pellet evacuation. These nonzero angles of the bottom panels 205a-205c are illustrated in FIGS. 2B and 2C, which illustrate front and side views of the hopper bottom 200 illustrated in FIG. 2A. For example, in one or more embodiments, as seen in FIG. 2B, the first bottom panel 205a may form a first nonzero angle $\theta_1$ relative to the horizontal plane H of between about 40 degrees and 60 degrees. In one or more embodiments, the first nonzero angle $\theta_1$ may be between about 45 degrees and 55 degrees, and preferably about 50 degrees.

Also, as shown in FIG. 2C, in one or more embodiments, the second bottom panel 205b may form a second nonzero angle $\theta_2$ relative to the horizontal plane H of between about 15 degrees and 35 degrees. In one or more embodiments, the second nonzero angle $\theta_2$ may be between about 20 degrees and 30 degrees. In one or more embodiments, the second nonzero angle $\theta_2$ is preferably about 25 degrees.

As seen in FIG. 2B, in one or more embodiments, the third bottom panel 205c may form a third nonzero angle θ3 relative to the horizontal plane H of between about 15 degrees and 35 degrees, or between about 20 degrees and 30 degrees. Preferably, in one or more embodiments, the second nonzero angle $\theta_2$ is about 25 degrees.

Figure 3A:
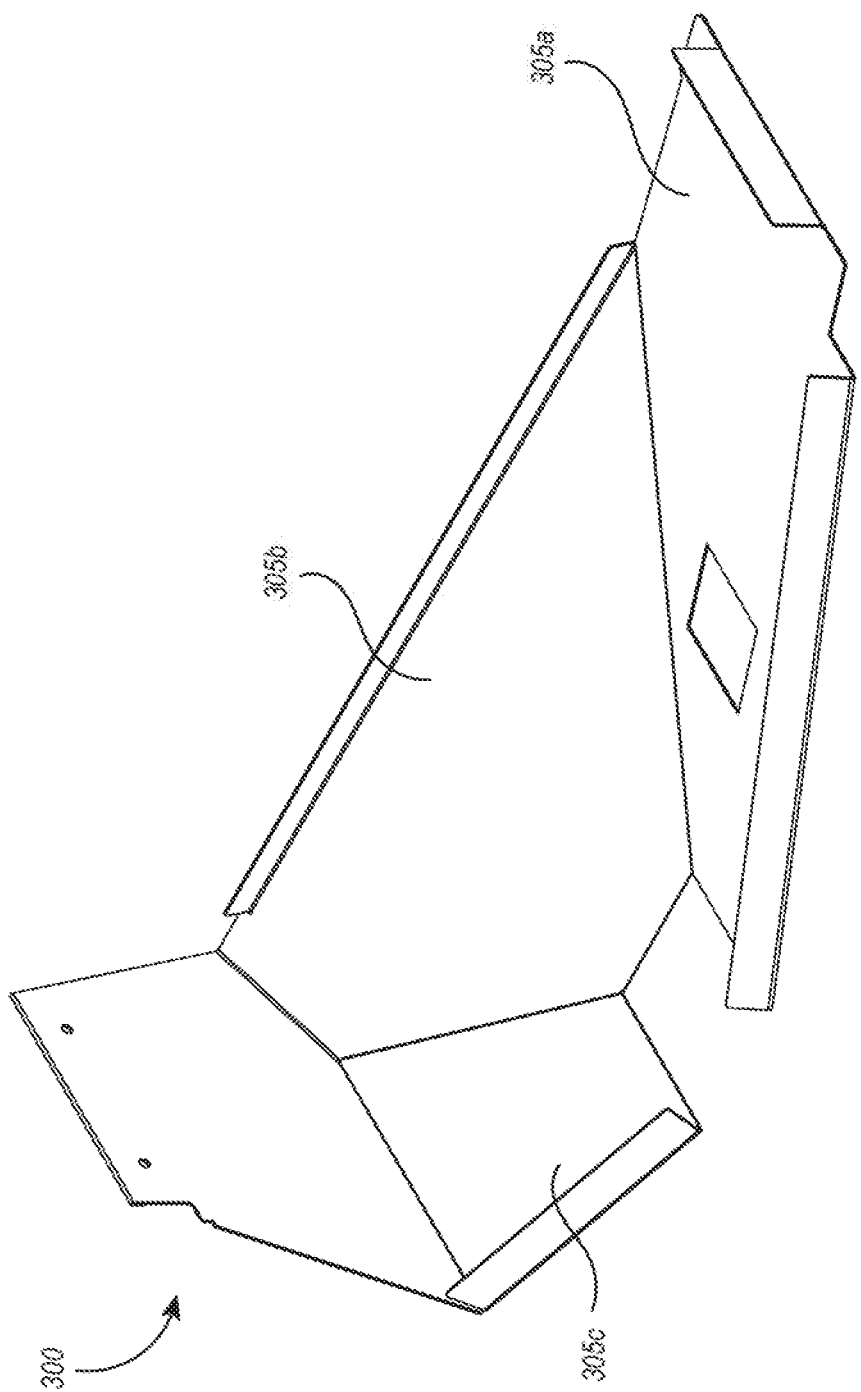
FIG. 3A illustrates a perspective view of a hopper bottom according to the present disclosure.
Figure 3B:
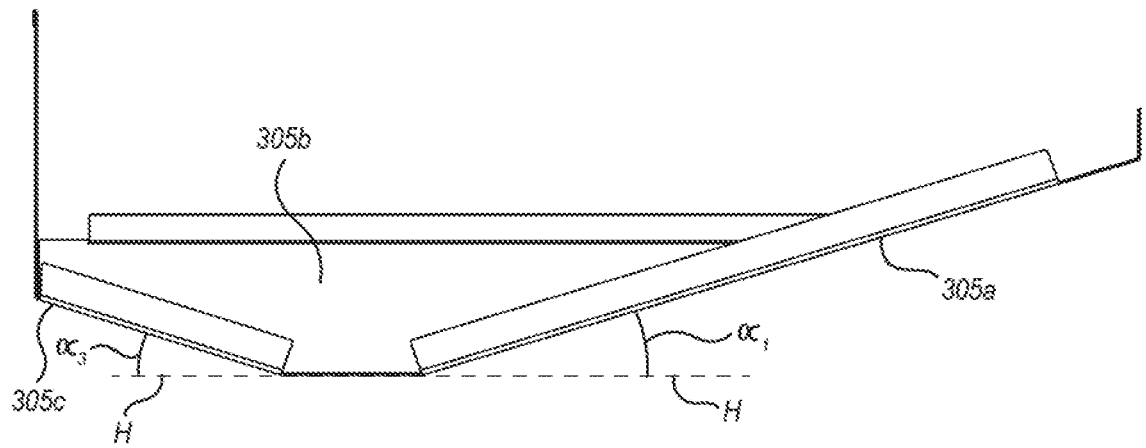
FIG. 3B illustrates a front view of a hopper bottom according to the present disclosure.
Figure 3C:
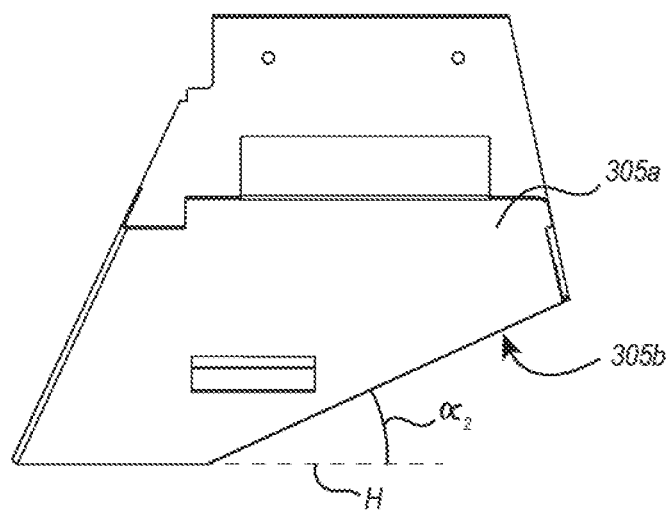
FIG. 3C illustrates a left view of a hopper bottom according to the present disclosure.

Along these lines, FIGS. 3A-3C illustrate an embodiment of a hopper bottom 300 having bottom panels 305a-305c disposed at various other angles $\alpha_{1-3}$ relative to the horizontal plane H. In the embodiment illustrated in FIGS. 3A-3C, the angles of the first, second, and third panels 305a-305c may be less than the angles of respective bottom panels 205a-205c illustrated in FIGS. 2A-2C. In this way, the volume may be maximized within the hopper bottom 300. This extra volume may be advantageous depending on where the manufacturer disposes the pellet hopper 100.

For example, with reference back to FIG. 1, in one or more embodiments, the manufacturer may dispose the cavity 120 and pellet hopper 100 on a front side of the pellet grill 110. In such a front-loaded hopper configuration, it may be advantageous and convenient for the user to reduce the horizontal depth of the cavity 120, and thus the cavity volume, that extends out in front of the pellet hopper 100. One will appreciate that the volume of the cavity 120 may vary depending on where the manufacturer places the cavity 120 and pellet hopper 100 on the pellet grill 110.

In an embodiment having a front-loaded hopper with a reduced volume cavity 120, bottom panels 305a-305c of the hopper bottom 300 within the cavity 120, such as the hopper bottom 300 shown in FIGS. 3A-3C, may have reduced angles $\alpha_{1-3}$ relative to corresponding angles $\theta_{1-3}$ shown in FIGS. 2A-2C. These reduced angles $\alpha_{1-3}$ result in a larger volume within the cavity 120 available for loading fuel pellets 160.

For example, the first bottom panel 305a may form a first nonzero angle $\alpha_1$ relative to the horizontal plane H of between about 10 degrees and 30 degrees. In one or more embodiments, the first nonzero angle $\alpha_1$ may be between about 15 degrees and 25 degrees. In one or more embodiments, the first nonzero angle $\alpha_1$ is preferably about 17 degrees.

Also, as shown in FIG. 3C, the second bottom panel 305b may form a second nonzero angle $\alpha_2$ relative to the horizontal plane H of between about 15 degrees and 35 degrees. In one or more embodiments, the second nonzero angle $\alpha_2$ may be between about 20 degrees and 30 degrees. In one or more embodiments, the second nonzero angle $\alpha_2$ is preferably about 25 degrees.

In one or more embodiments, the third bottom panel 305c shown in FIG. 3B may form a third nonzero angle $\alpha_3$ relative to the horizontal plane H of between about 10 degrees and 30 degrees. In one or more embodiments, the third nonzero angle $\alpha_3$ may be between about 15 degrees and 25 degrees. In one or more embodiments, the third nonzero angle $\alpha_3$ is preferably about 17 degrees.

Again, as noted above, one or more embodiments of a hopper bottom may include bottom panels 205a-205c, 305a-305c disposed at various different angles $\theta$, $\alpha$ or combination thereof, as described herein. The manufacturer may determine those angles $\theta$, $\alpha$ based on a number of factors discussed above to optimize the transfer of fuel pellets 160 from the pellet hopper 100 to the auger feeder system 140 in a variety of different environments and configurations.

Figure 4A:
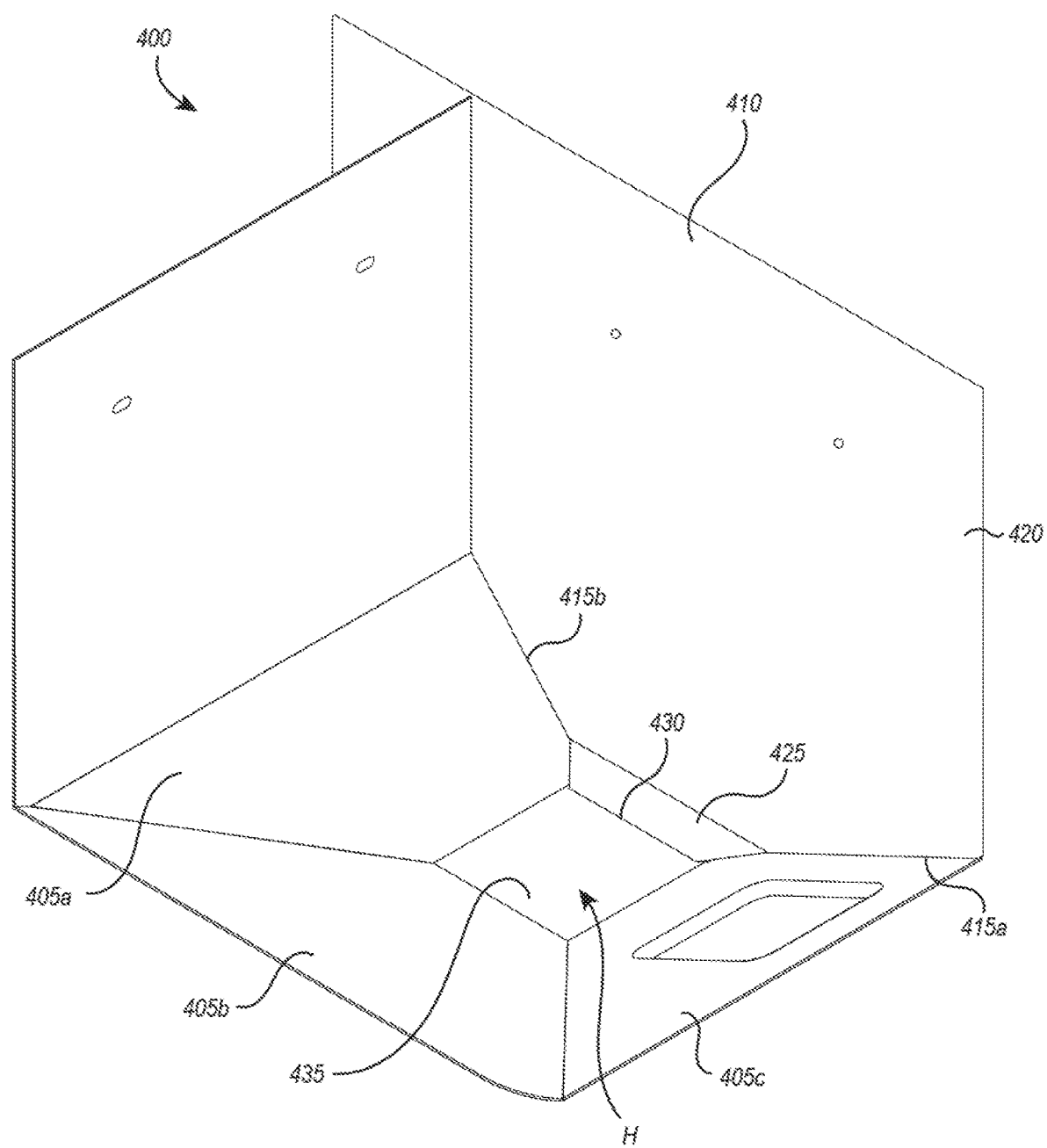
FIG. 4A illustrates a perspective view of a pellet hopper assembly according to an embodiment of the present disclosure.

FIG. 4A illustrates a perspective view of another embodiments of a pellet hopper 400 according to another embodiment of the present disclosure. Pellet hopper 400 includes a first bottom panel 405a, a second bottom panel 405b, and a third bottom panel 405c, similar to those shown in other embodiments described herein. In addition, pellet hopper 400 includes a wall panel 410 connected to the first and third bottom panels 405a, 405c at third and fourth interfaces 415a, 415b, respectively.

In one or more embodiments, the wall panel 410 includes a main surface 420 and a bottom angled surface 425. The main surface 420 wall panel 410 may extend vertically upward from the first and second bottom panels 405a, 405b and interface with the inside of the cavity 120 of the pellet grill 110 (as shown in FIGS. 1 and 2). The bottom angled surface 425 of the wall panel 410 is connected to the main surface 420. In one or more embodiments, the bottom angled surface 425 includes a fourth inner edge 430 that at least partially defines the pellet evacuation opening 435.

Similar to the bottom panels 405a-405c of the illustrated pellet hopper 400, the bottom angled surface 425 of the wall panel 410 may also be angled at a nonzero angle relative to the horizontal plane defined by the pellet evacuation opening 435. In this way, the bottom angled surface 425 of the wall panel 410 is tilted downward toward the pellet evacuation opening 435. The bottom angled surface 425 thus promotes the transfer of fuel pellets 160 from the pellet hopper 400 through the pellet evacuation opening 435.

Figure 4B:
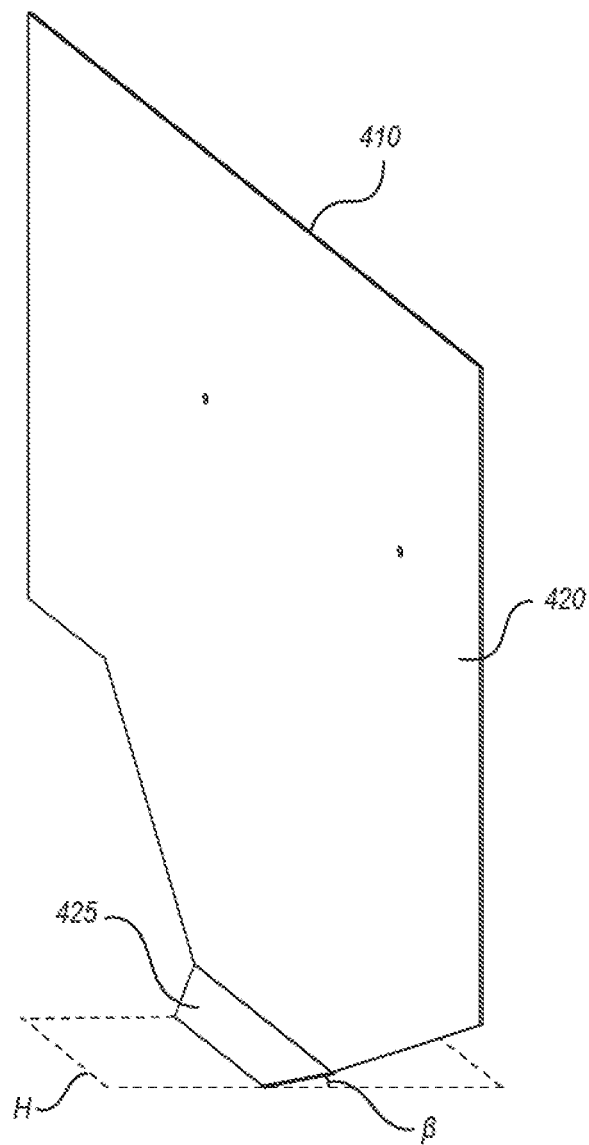
FIG. 4B illustrates a perspective view of a vertical wall portion of the pellet hopper assembly illustrated in FIG. 4A according to an embodiment of the present disclosure.

Along these lines, FIG. 4B illustrates a perspective view of just the wall panel 410 illustrated in FIG. 4A. As shown, the bottom angled surface 425 of the wall panel 410 connects to the main surface 420 and extends at a nonzero angle $\beta$ relative to the horizontal plane H. The horizontal plane H is defined by the pellet evacuation opening 435 shown in FIG. 4A. Like the other nonzero angles $\alpha$, $\theta$ described herein with reference to bottom panels 205a-205c, 305a-305c shown in FIGS. 2A-3C, nonzero angle $\beta$ may vary in different embodiments. For example, nonzero angle $\beta$ may be similar to any of the angles $\alpha$, $\theta$ described above with reference to other embodiments.

Also, nonzero angle $\beta$ may be different than any of the angles $\alpha$, $\theta$ described above with reference to other embodiments. For example, angle $\beta$ may be between about 5 degrees and 15 degrees or between about 60 degrees and 80 degrees. Again, the manufacturer can form the bottom angled surface 425 at any number of angles depending on the frictional and environmental factors noted above to optimize the transfer of fuel pellets 160.

Figure 5A:
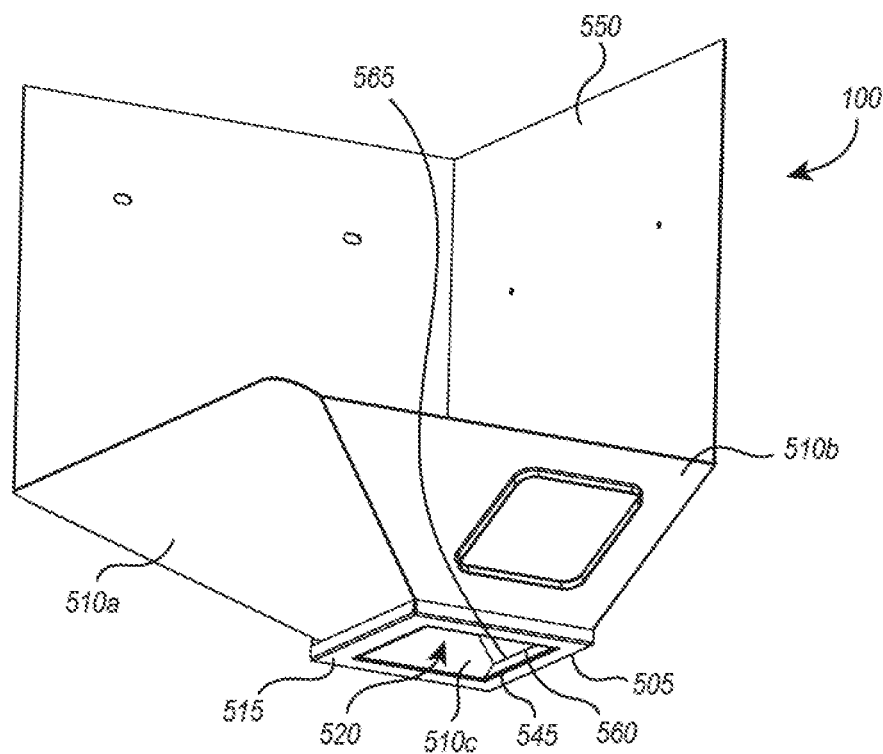
FIG. 5A illustrates a bottom perspective view of a pellet hopper assembly including a shelf plate according to an embodiment of the present disclosure.

FIG. 5A illustrates a bottom perspective view of another embodiment of a pellet hopper 100 that also includes a shelf plate 505. The shelf plate 505 may be disposed below the bottom panels 510a-510c of the pellet hopper 100. In one or more embodiments, the shelf plate 505 is connected to at least one of the bottom panels 510a-510c of the pellet hopper 100 and forms a horizontal surface 515 disposed below the bottom panels 510a-510c. In one or more embodiments, the horizontal surface 515 may be parallel to a horizontal plane in which the pellet evacuation opening 520 lies. Additionally, or alternatively, in one or more embodiments, the horizontal surface 515 of the shelf plate 505 is parallel and coplanar with the horizontal plane in which the pellet evacuation opening 520 lies.

Figure 5B:
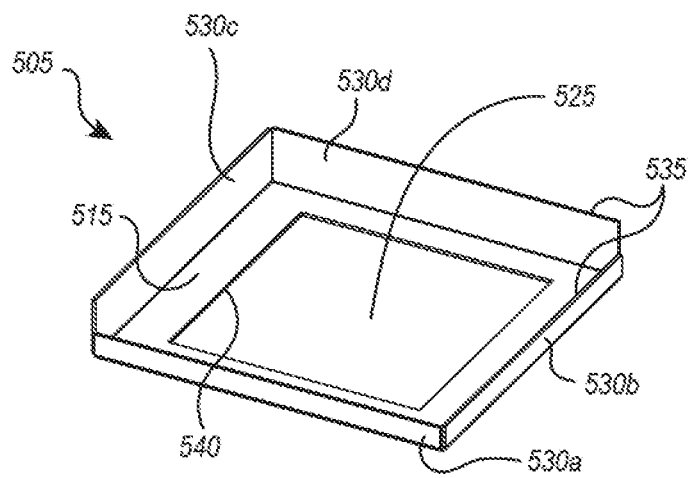
FIG. 5B illustrates a perspective view of a shelf plate according to an embodiment of the present disclosure.

FIG. 5B shows a top perspective view of an embodiment of a shelf plate 505 according to the present disclosure. In the illustrated embodiment, the shelf plate 505 includes a horizontal surface 515 extending around and at least partially defining a shelf plate opening 525. One or more vertical surfaces 530a-530d extend upward from the horizontal surface 515. In one or more embodiments, the vertical surfaces 530a-530d of the shelf plate 505 may extend up from the horizontal surface 515 at various heights.

In one or more embodiments, the height of each vertical surface 530a-530d may extend up to the bottom surface of a respective bottom panel 510a-510c of the pellet hopper 100. Because each bottom panel 510a-510c of the pellet hopper 100 may form a different nonzero angle, as discussed above, each respective vertical surface 530a-530d of the shelf plate 505 may necessarily extend upward to varying heights in order to extend between the horizontal surface 515 of the shelf plate 505 and the bottom surface of the corresponding bottom panel 510a-510c. Accordingly, one will appreciate that the height of each vertical surface 530a-530d of the shelf plate 505 may therefore vary depending on the angles of the bottom panels 510a-510c to which the shelf plate 505 is connected.

In one or more embodiments, the shelf plate 505 is connected to the pellet hopper 100 where the upper edge 535 of each vertical surface 530a-530d of the shelf plate 505 contacts the bottom surfaces of the bottom panels 510a-510c of the pellet hopper 100. Additionally, or alternatively, the perimeter edge 540 of the shelf plate opening 525 may be connected to the inner edges 545 of respective bottom panels 510a-510c.

Figure 5C:
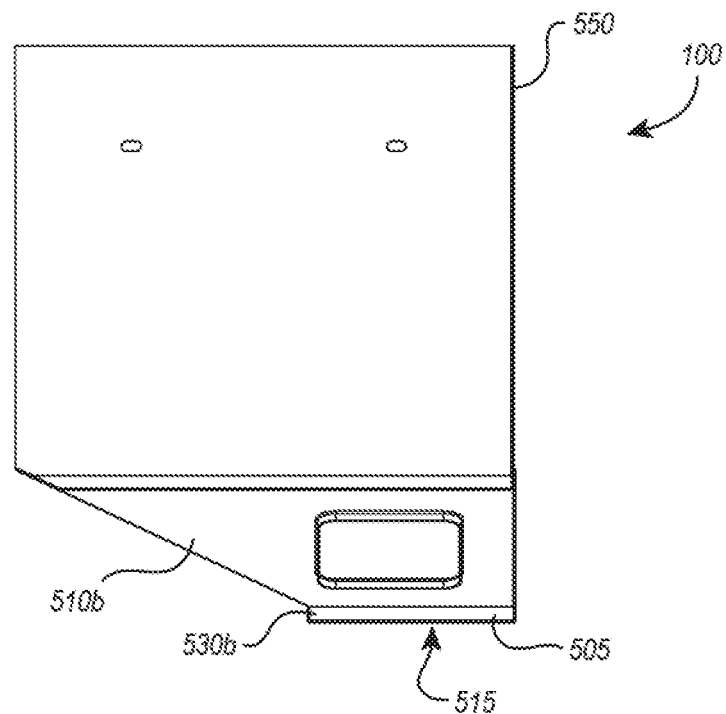
FIG. 5C illustrates a left side view of a pellet hopper assembly according to an embodiment of the present disclosure.

FIG. 5C illustrates a side view of the pellet hopper 100 illustrated in FIG. 5A. In the illustrated embodiment, the vertical surface 530b of the shelf plate 505 extends from the bottom surface of the bottom panel 510b to the horizontal surface 515 of the shelf plate 505. Additionally, one will note that the embodiment of the pellet hopper 100 illustrated in FIGS. 5A, 5C, 5D, includes a wall panel 550. In such an embodiment, a vertical surface 530d of the shelf plate 505 may extend from the horizontal surface 515 of the shelf plate 505 to the main surface 555 of the wall panel 550.

Figure 5D:
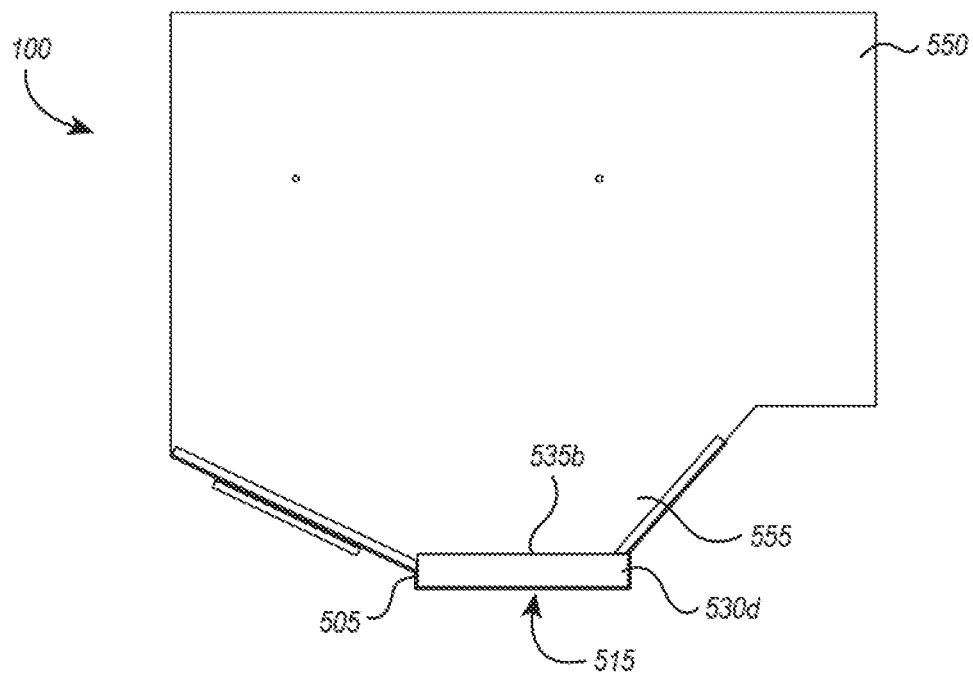
FIG. 5D illustrates a rear view of a pellet hopper assembly according to an embodiment of the present disclosure.

Thus, in one or more embodiments, the vertical surface 530d of the shelf plate 505 may span the vertical height of the bottom angled surface 560 of the wall panel 550, shown in FIG. 5A. As such, as shown in FIG. 5D, the vertical surface 530d of the shelf plate 505 corresponding in position with the wall panel 550 may be connected to the main surface 555 of the wall panel.

Additionally, or alternatively, in one or more embodiments, the upper edge 535b of the vertical surface 530d of the shelf plate 505 corresponding in position with the wall panel 550 may be connected to the interface 565 between the main surface 555 and the bottom angled surface 560 of the wall panel 550.

The horizontal surface 515 of the shelf plate 505 provides a surface on which a manufacturer can place a gasket or seal between the pellet hopper 100 and auger feeder system 140. In such a configuration, the horizontal surface 515 of the shelf plate 505 provides a flat, level surface with which a gasket or seal can effectively interface. This may advantageously provide an improved, water-tight seal between the pellet hoppers 100 and auger feeder system 140 of the present disclosure. As such, moisture is not likely to enter the pellet hopper 100 and affect the frictional properties of the pellet hopper 100 and fuel pellets 160, or otherwise negatively affect the pellet hopper 100 through material corrosion and the like.

In addition, in one or more embodiments, the shelf plate opening 525 is at least as large as the pellet evacuation opening 520 of the pellet hopper 100. In this way, the horizontal surface 515 of the shelf plate 505 extends around and away from the pellet evacuation opening 520. Thus, the shelf plate 505 does not occlude the pellet evacuation opening 520 or hinder the fuel pellets 160 flowing therethrough during use.

Figure 5E:
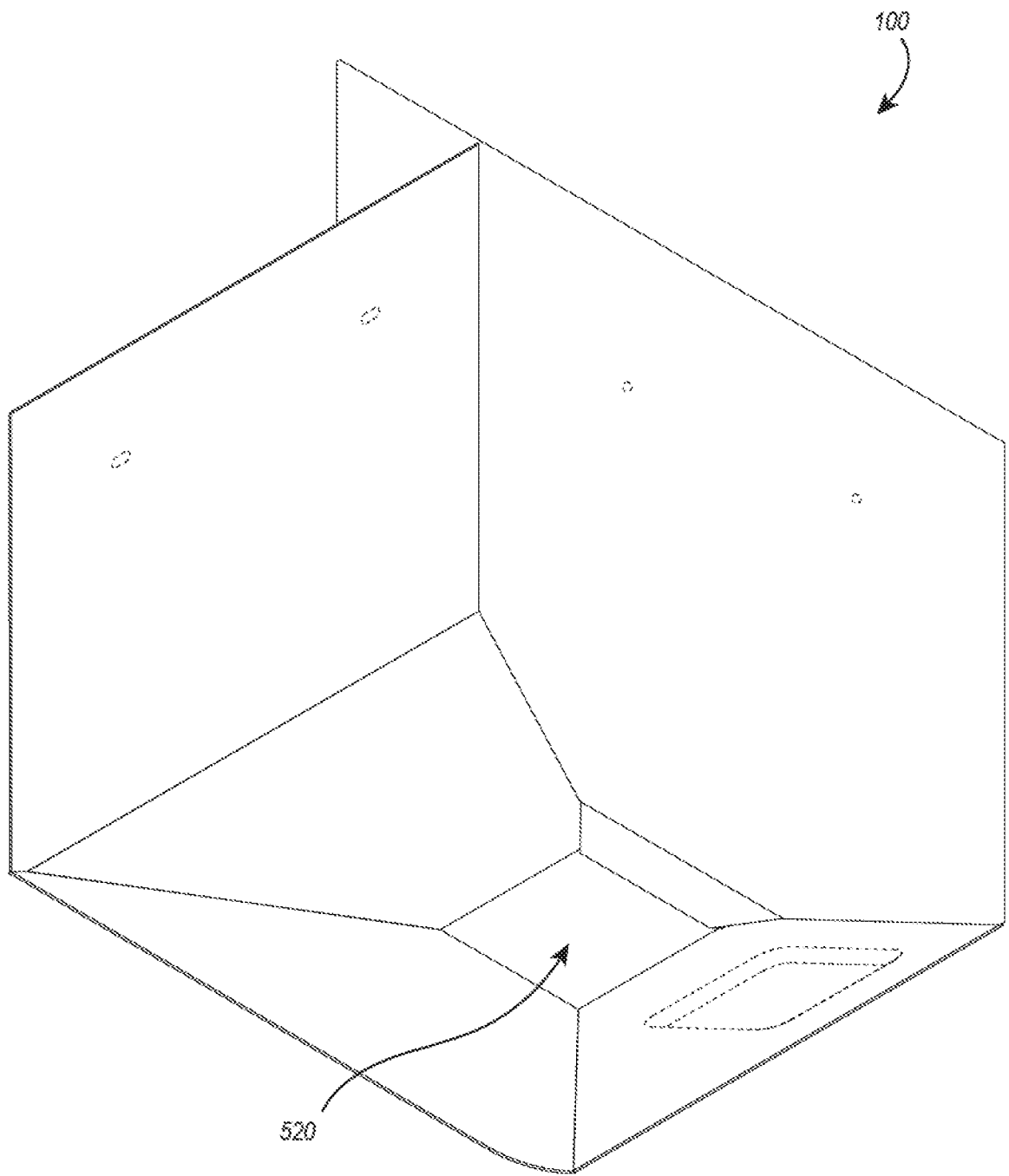
FIG. 5E illustrates a top perspective view of the pellet hopper assembly illustrated in FIG. 5A according to an embodiment of the present disclosure.

The top perspective view of the pellet hopper 100 illustrated in FIG. 5E, which is similar to the pellet hopper 100 of FIG. 5A, includes a shelf plate 505 disposed below the bottom panels 510a-510c. However, as illustrated from the top perspective view, no portion of the shelf plate 505 obstructs, extends into, or otherwise physically interferes with the pellet evacuation opening 520.

However, in one or more embodiments of a pellet grill, the opening to the auger feeder system 140 may be smaller than the pellet evacuation opening with which the auger feeder system 140 interfaces. Additionally, or alternatively, one or more sealing components, such as a gasket or other type of seal, may at least partially occlude the pellet evacuation openings described herein. For example, FIG. 6 shows an embodiment of a pellet hopper 100 having a partially occluded pellet evacuation opening 605.

As noted above, and as shown in FIG. 6, a number of obstacles may occlude the pellet evacuation opening 605. These obstacles may include a sealing gasket or other component of an auger feeder system 140 to which the pellet hopper 100 is connected. In addition, in one or more embodiments, as shown in FIG. 6, a pellet grill may include a pellet hopper 100 that includes one or more horizontal features 610 extending from the inner edges 615 of the bottom panels 620.

Figure 6:
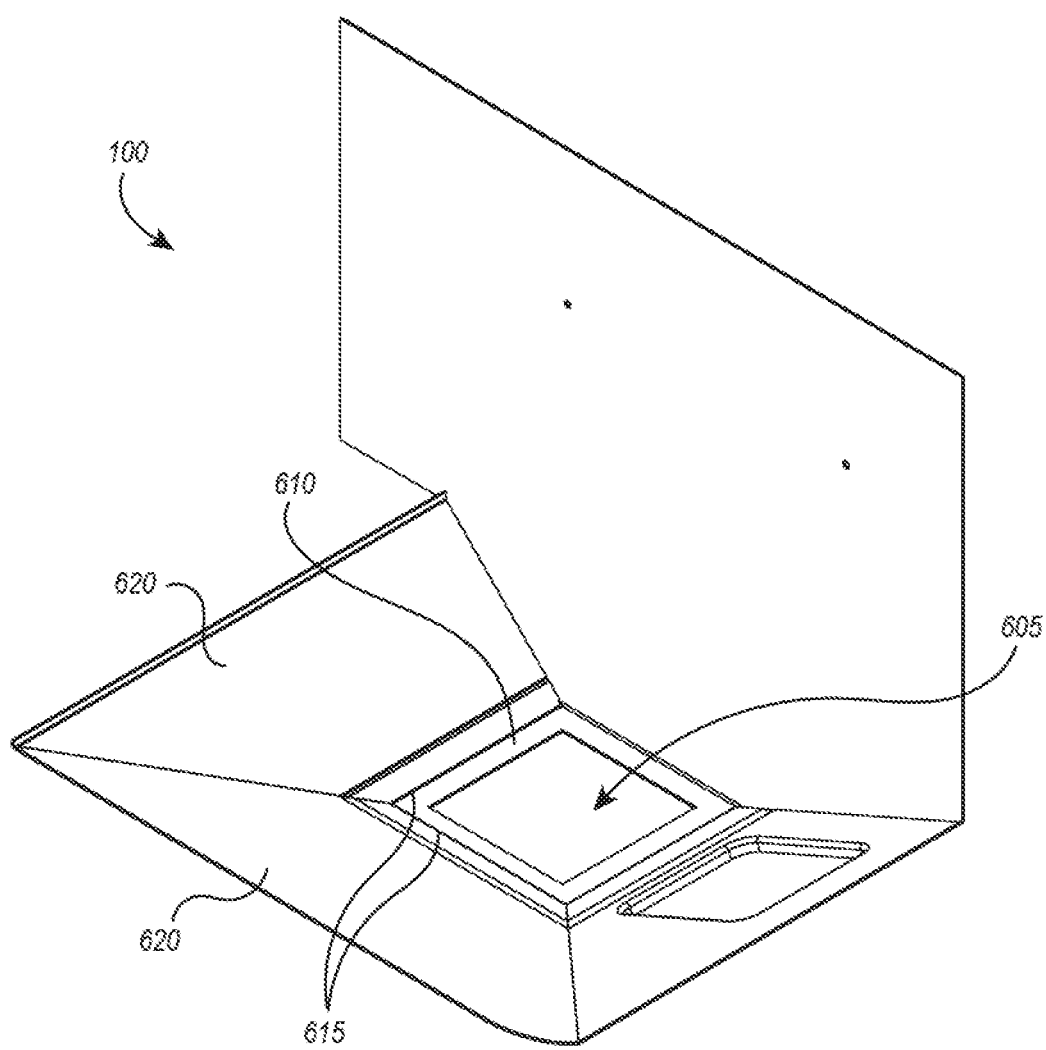
FIG. 6 illustrates a pellet hopper assembly with horizontal surfaces surrounding a pellet evacuation opening thereof.

In the illustrated embodiment of FIG. 6, a horizontal feature 610 extends inward from the inner edges 615 of the bottom panels 620 to at least partially occlude the pellet evacuation opening 605. In such an embodiment, it may be advantageous to minimize the negative affect these horizontal features 610 may have on the flow of fuel pellets 160 through the pellet evacuation opening 605. For example, the horizontal feature 610, or any other pellet evacuation opening 605 occlusion feature (whether horizontal or not), may cause fuel pellets 160 flowing through the pellet evacuation opening 605 to build-up and clog within the pellet hopper 100.

Figure 7:
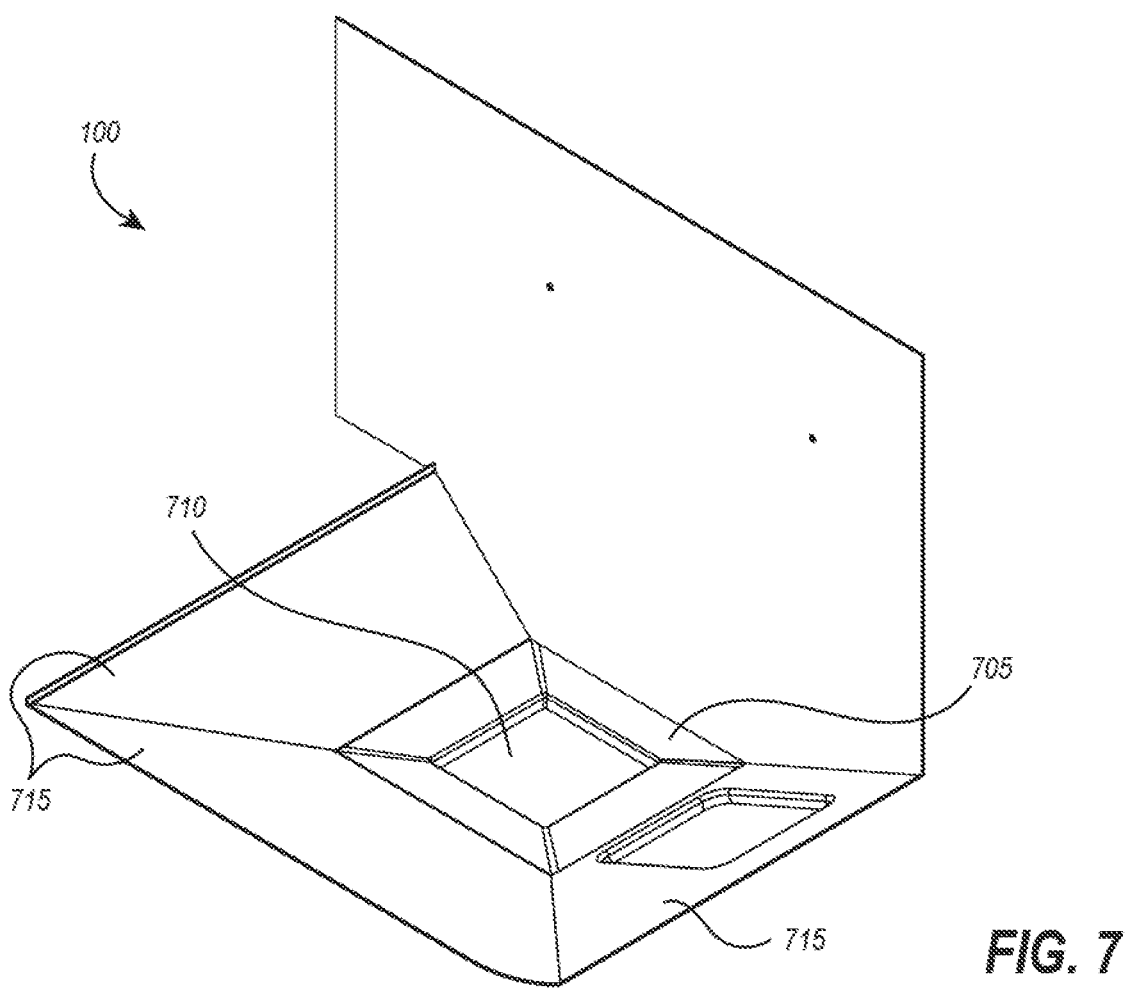
FIG. 7 illustrates a perspective view of a pellet evacuation insert positioned within a hopper bottom with horizontal surfaces surrounding the pellet evacuation opening.

Accordingly, one or more embodiments of a pellet hopper 100 may include a pellet evacuation insert 705. As seen in FIG. 7, a manufacturer or user may dispose the pellet evacuation insert 705 within the pellet hopper 100. The pellet evacuation insert 705 may sit over and around the pellet evacuation opening 710 and on top of a bottom portion of the bottom panels 715. The pellet evacuation insert 705 may advantageously cover any occlusion of the pellet evacuation opening 710, such as the horizontal features 610 illustrated in FIG. 6, and provide smooth, angled surfaces extending from the bottom panels 715 to the pellet evacuation opening 710.

Figure 8A:
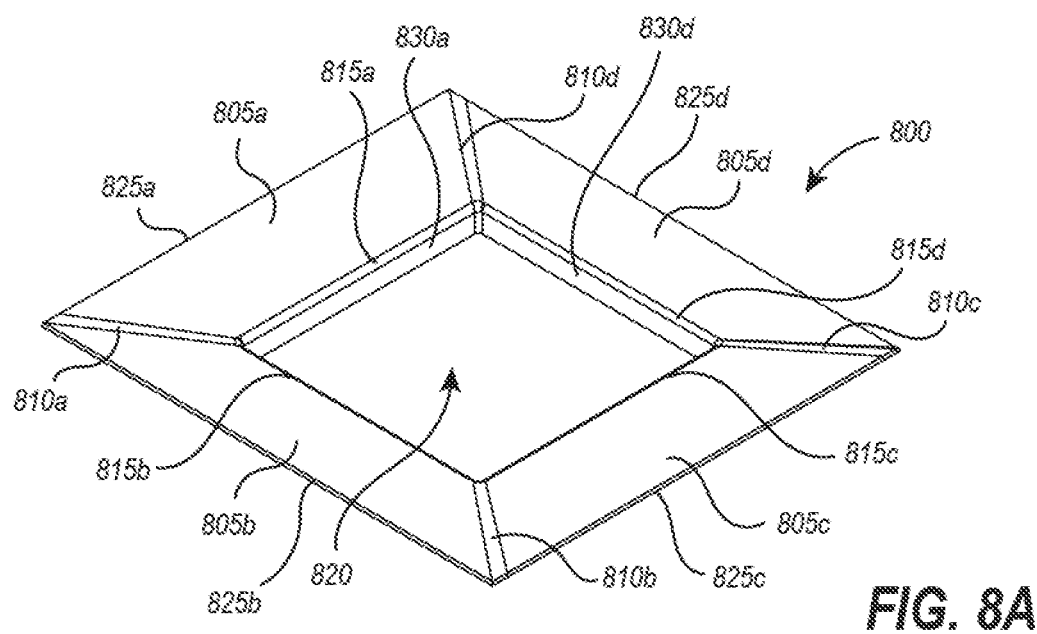
FIG. 8A illustrates a perspective view of a pellet evacuation insert according to an embodiment of the present disclosure.

Along these lines, FIG. 8A illustrates a top perspective view of an embodiment of a pellet evacuation insert 800. The pellet evacuation insert 800 includes a first insert panel 805a connected to a second insert panel 805b at a first interface 810a and a third insert panel 805c connected to the second insert panel 805b at a second interface 810b. In addition, in one or more embodiments, the pellet evacuation insert 800 includes a fourth insert panel 805d connected to the third and first insert panels 805c, 805a at third and fourth interfaces 810c, 810d, respectively.

In addition, each insert panel 805a-805d includes a corresponding inner edge 815a-815d that at least partially defines a pellet evacuation insert opening 820. In one or more embodiments, each insert panel 805a-805d is trapezoidal. Also, in one or more embodiments, the pellet evacuation insert opening 820 formed by the inner edges 815a-815d is rectangular. One will appreciate that the shape of the pellet evacuation insert opening 820 and the insert panels 805a-805d may vary depending on the number of insert panels 805a-805d included in the pellet evacuation insert 800.

Each insert panel 805a-805d forms a nonzero angle relative to the horizontal plane in which the inner edges 815a-815d lie. In this way, each insert panel 805a-805d tilts downward toward the pellet evacuation insert opening 820 to promote the flow of fuel pellets 160 down into the auger feeder system 140. When the pellet evacuation insert 800 is disposed within a pellet hopper 100, such as that shown in FIG. 7, the outer edges 825a-825d of the insert panels 805a-805d come into contact with the upper surfaces of respective bottom panels 715 of the pellet hopper 100.

In this way, a fuel pellet 160 flowing down one of the bottom panels 715 may smoothly transition from the surface of the bottom panel 715 and across the upper surface of the insert panel 805a-805d. Then, the fuel pellet 160 can flow down through the pellet evacuation insert opening 820 and thus through the pellet evacuation opening 710. In order to form the smooth transition between the bottom panels 715 and the insert panels 805a-805d, the nonzero angles formed by the insert panels 805a-805d must be less than the nonzero angles θ of the bottom panels 715.

For example, FIG. 8B illustrates a front view of the pellet evacuation insert 800 shown in FIG. 8A. In addition, FIG. 8B illustrates a cross-sectional view of the bottom panels 715 illustrated in FIG. 7 on which the pellet evacuation insert 800 is disposed. The bottom panels 715 may also include an obstructing feature of horizontal features 610 that at least partially occludes the pellet evacuation opening 605, similarly as shown in FIG. 6. In such a configuration, the nonzero angles $\mu_1, \mu_3$ of the first and third insert panels 805a, 805c relative to the horizontal plane H are less than the nonzero angles $\theta_1$, $\theta_3$ formed by the first and third bottom panels 715, respectively.

As a non-limiting example, the embodiment shown in FIG. 8B may have a first bottom panel 715 disposed at a nonzero angle $\theta_1$ of 40 degrees. In such an embodiment, the nonzero angle $\mu_1$ of the first insert panel 805a is less than 40 degrees. In this way, the first insert panel 805a of the pellet evacuation insert 800 can span the horizontal feature 610 occluding the pellet evacuation opening of the pellet hopper and provide a transition surface over which fuel pellets 160 may flow into the pellet evacuation opening.

Likewise, as shown in FIGS. 8B and 8C, the non-zero angles $\mu_{2-4}$ of insert panels 805b-805d are less than the non-zero angles $\theta_{2-4}$ of the bottom panels 715 with which the insert panels 805b-805d come into contact. For example, in one embodiment where $\theta_3$ is 25 degrees, then $\mu_3$ is less than 25 degrees. Likewise, for example, in one embodiment where $\theta_2$ is 30 degrees and $\theta_4$ is 50 degrees, then $\mu_3$ is less than 30 degrees and $\mu_4$ is less than 50 degrees.

The foregoing are not meant to be limiting in any way. Rather, the foregoing examples are given to illustrate that the nonzero angles $\mu_{1-4}$ of each insert panel 805a-805d are less than the angles $\theta_{1-4}$ of corresponding bottom panels 715 on which the pellet evacuation insert 800 rests. In this way, the pellet evacuation insert may be configured such that each insert panel 805a-805d contacts the upper surfaces of a corresponding bottom panel 715 of a pellet hopper and spans any physical occlusions of horizontal features 610 blocking a pellet evacuation opening. Accordingly, the pellet evacuation insert may advantageously promote the flow of fuel pellets 160 down to the auger feeder system 140, even if a one or more occlusions of horizontal features 610 partially blocks the pellet evacuation opening.

One will appreciate that the nonzero angle $\mu_{1-4}$ of each insert panel 805a-805d may vary between embodiments depending on the nonzero angles $\theta_{1-4}$, $\alpha_{1-4}$ of the bottom panels 715. Since the nonzero angles $\theta_{1-4}$, $\alpha_{1-4}$ of the bottom panels 715 vary between pellet hopper embodiments as described herein, the nonzero angle $\mu_{1-4}$ of each insert panel 805a-805d of various embodiments of the pellet evacuation insert 800 may also vary accordingly.

Also, as shown in FIGS. 8A-8C, in one or more embodiments of the pellet evacuation insert 800, one or more vertical walls 830a-830d extend from the inner edges 815a-815d of the pellet evacuation insert 800, respectively. The vertical walls 830a-830d extend vertically downward into the pellet evacuation opening of a pellet hopper during use. In one or more embodiments, each wall may extend through a pellet hopper opening and into the auger feeder system 140 to which the pellet hopper 100 is connected. Alternatively, in one or more embodiments, the vertical walls 830a-830d may extend only partially through a pellet evacuation opening toward the auger feeder system 140.

Also, in one or more embodiments, each vertical wall 830a-830d may extend downward to varying degrees. In one or more embodiments, the vertical walls 830a-830d may extend downward through a pellet evacuation opening so as to shield flowing fuel pellets 160 from encountering any components between a pellet hopper and auger feeder system 140. Such components may include the shelf plates, auger feeder system opening, gaskets, or seals described herein. These interface components may reside at or near the interface 110' between the pellet hopper 100 and auger feeder system 140, such as those shown in FIG. 1C.

Interface components positioned at the interface may present edges, crevasses, or other non-smooth contours through the interface 110'. These non-smooth features of any interface components may occlude the pellet evacuation opening or otherwise occlude fuel pellets 160 flowing into the auger feeder system 140. Accordingly, the vertical walls 830a-830d of the pellet evacuation insert 800 may extend at least partially through the interface 110' and provide sidewalls having smooth surfaces through the interface. In this way, the vertical walls 830a-830d of the pellet evacuation insert 800 may further reduce the chance of fuel pellets 160 clogging and backing up as they flow through the pellet evacuation opening of a pellet hopper 100.

In addition, in one embodiment according to the present disclosure, a manufacturer can form the pellet evacuation insert 800 separately from the pellet hoppers 100 described herein. In such an embodiment, a user or manufacturer can separately and selectively combine the pellet evacuation insert 800 into a pellet hopper 100 when needed. Alternatively, in one or more embodiments of pellet hoppers 100 described herein, the manufacturer may form the pellet evacuation insert integrally with a pellet hopper 100 as one piece. In this way, the manufacturer can ensure the effective flow of fuel pellets 60 as provided by the pellet evacuation insert 800 described herein.

One will also appreciate, as noted above, that in one or more embodiments, the vertical walls 830a-830d of the pellet evacuation insert 800 may also extend from the inner edges of the bottom panels described herein, rather than a separate pellet evacuation insert 800. This may be the case in an embodiment where the pellet evacuation insert 800 is formed integrally with a pellet hopper 100, as described above. In such an embodiment, the vertical walls 830a-830d extending from inner edges of the bottom panels of a pellet hopper 100 may serve the same function and provide the same advantages as the vertical walls 830a-830d extending from the inner edges 815a-815d of the various insert panels 805a-805d of the pellet evacuation insert 800.

In addition to the various embodiments described herein, the present invention can be embodied in other specific forms without departing from its intended spirit or essential characteristics. The embodiments described herein are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A pellet hopper for use in a pellet grill, the pellet hopper comprising:
   a first bottom panel having a first inner edge;
   a second bottom panel having a second inner edge, the second bottom panel connected to the first bottom panel at a first interface;
   a third bottom panel having a third inner edge, the third bottom panel connected to the second bottom panel at a second interface;
   a wall panel extending between the first bottom panel and the third bottom panel and connected to the first bottom panel at a third interface and the third bottom panel at a fourth interface, the wall panel comprising:
   a main portion extending vertically upward from the third and fourth interfaces; and
   a bottom angled surface connected to and extending from a bottom edge of the main portion, the bottom angled surface having a fourth inner edge;
   wherein:

the first, second, and third inner edges of the respective bottom panels and the fourth inner edge of the bottom angled surface at least partially define a pellet evacuation opening; and the first, second, and third bottom panels respectively form first, second, and third nonzero angles with respect to a horizontal plane such that each bottom panel tilts downward toward the pellet evacuation opening.

2. The pellet hopper of claim 1, further comprising first, second, and third vertical walls connected to the first, second, and third bottom panels, respectively, the first, second, and third vertical walls extending vertically downward from innermost edges that define the pellet evacuation opening.

3. The pellet hopper of claim 1, further comprising a fourth bottom panel having a fourth inner edge, the fourth bottom panel connected to the third bottom panel.

4. The pellet hopper of claim 1, further comprising a shelf plate disposed below the first, second, and third bottom panels and connected to the first, second, and third bottom panels, the shelf plate forming a horizontal surface disposed below the first, second, and third bottom panels.

5. The pellet hopper of claim 4, wherein the horizontal surface formed by the shelf plate is disposed outwardly from the pellet evacuation opening so as to not obstruct the pellet evacuation opening.

6. The pellet hopper of claim 1, wherein the first nonzero angle is between about 40 degrees and 60 degrees.

7. The pellet hopper of claim 1, wherein the second nonzero angle is between about 15 degrees and 35 degrees.

8. The pellet hopper of claim 1, wherein the third nonzero angle is between about 15 degrees and 35 degrees.

9. A pellet hopper assembly, comprising:
   a hopper bottom, comprising:
      a first panel connected to a second panel at a first interface and the second panel connected to a third panel at a second interface, wherein a first inner edge of the first panel, a second inner edge of the second panel, and a third inner edge of the third panel together define a pellet evacuation opening, and wherein:
         the first panel forms a first nonzero angle with respect to a horizontal plane such that the first panel tilts downward toward the pellet evacuation opening,
         the second panel forms a second nonzero angle with respect to the horizontal plane such that the second panel tilts downward toward the pellet evacuation opening; and
         the third panel forms a third nonzero angle with respect to the horizontal plane such that the third panel tilts downward toward the pellet evacuation opening; and
      a wall panel extending between first and third panels and connected to the first and third panels at third and fourth interfaces, respectively, the wall panel comprising:
         a main surface extending vertically upward from the third and fourth interfaces; and
         a bottom angled surface connected to and extending from a bottom edge of the main surface, the bottom angled surface including a fourth inner edge that at least partially defines the pellet evacuation opening, the bottom angled surface forming a fourth nonzero angle with respect to the horizontal plane such that the bottom angled surface tilts downward toward the pellet evacuation opening.

10. The pellet hopper assembly of claim 9, further comprising a shelf plate disposed below the first, second, and third panels and connected to at least one of the first, second, and third panels, the shelf plate forming a horizontal surface disposed below the first, second, and third panels and a fourth panel.

11. The pellet hopper assembly of claim 10, wherein the horizontal surface of the shelf plate is coplanar with the pellet evacuation opening.

\* \* \* \* \*